United States Patent [19]

Tsuge et al.

[11] 4,358,135
[45] Nov. 9, 1982

[54] CONNECTOR FOR IGNITING CIRCUIT OF PRIMING DEVICE

[75] Inventors: Noboru Tsuge, Kariya; Satosi Kuwakado, Aichi; Katsuyuki Tanaka, Okazaki; Toshiaki Shimogawa, Aichi, all of Japan

[73] Assignee: Nippon Soken, Inc., Nishio, Japan

[21] Appl. No.: 202,433

[22] Filed: Oct. 30, 1980

[30] Foreign Application Priority Data

Nov. 2, 1979 [JP] Japan .................. 54-152706[U]

[51] Int. Cl.³ .................. B60R 21/10; H01R 13/71
[52] U.S. Cl. .................. 280/806; 200/51.1; 339/14 R
[58] Field of Search .................. 200/51.1, 51.09; 339/14 R, 14 P; 280/806

[56] References Cited

U.S. PATENT DOCUMENTS

| | | | |
|---|---|---|---|
| 3,509,297 | 4/1970 | King | 200/51.1 |
| 3,903,385 | 9/1975 | Moyer et al. | 200/51.1 |
| 4,008,780 | 2/1977 | Bendler et al. | 280/806 |
| 4,015,093 | 3/1977 | Cote | 200/51.1 |
| 4,087,151 | 5/1978 | Robert | 200/51.1 |
| 4,237,690 | 12/1980 | Tsuge et al. | 280/806 |
| 4,288,098 | 9/1981 | Tsuge et al. | 280/806 |

FOREIGN PATENT DOCUMENTS

2743406  5/1978  Fed. Rep. of Germany .... 339/14 R

*Primary Examiner*—John W. Shepperd
*Attorney, Agent, or Firm*—Cushman, Darby & Cushman

[57] ABSTRACT

A connector provided in an igniting circuit for connecting an igniting signal generator and a priming device comprises a first connector member and a second connector member which are connectable to each other. The first connector member comprises a pair of signal terminals connected to the priming device and a ground terminal connected to the ground line. The signal terminals are elastically contacted with the ground terminal. The second connector member comprises a pair of signal terminals connected to the igniting signal generator. These signal terminals are insulated from each other. When the first connector member is connected to the second connector member, the signal terminal of the first connector member are automatically separated from the ground terminal and then are contacted with the signal terminals of the second connector member.

9 Claims, 6 Drawing Figures

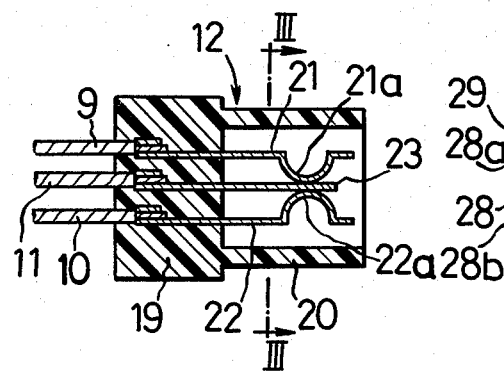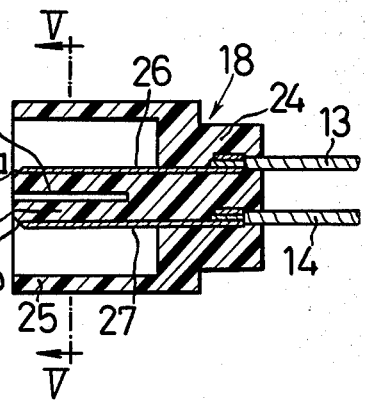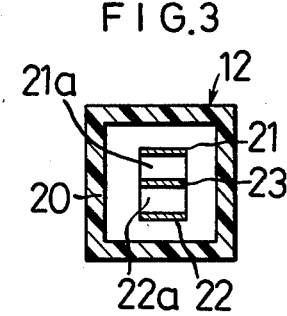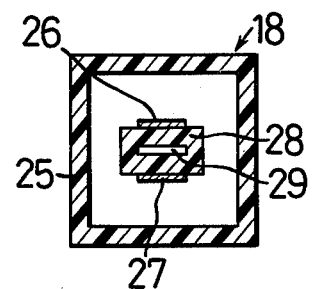

F I G. 6
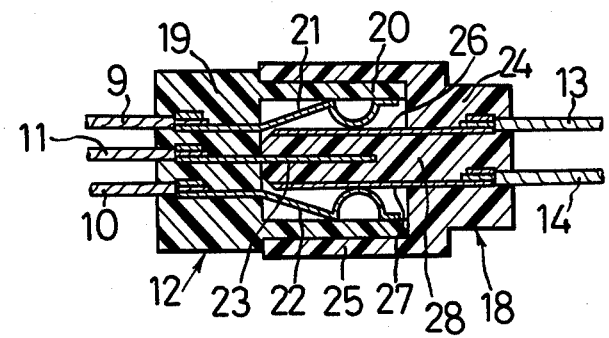

CONNECTOR FOR IGNITING CIRCUIT OF PRIMING DEVICE

BACKGROUND OF THE INVENTION

The present invention relates to a connector to be provided in an igniting circuit of a priming device.

Conventionally, the igniting circuit has been formed as follows.

Namely, at first, signal lines on the side of the priming device are connected with a ground line by means of a twisting connection in order to prevent the priming device from igniting and exploding by the leakage current due to the inductive noise. Next, the connection between the signal lines on the side of the priming device and the ground line is released and then the signal lines on the side of the priming device are connected to those on the side of the igniting signal generator.

In the conventional igniting circuit as described above, the signal lines on the side of the priming device are connected to those on the side of the igniting signal generator after being separated from the ground line which was once connected to the signal lines on the side of the priming device. Thus, the connecting work efficiency is not good.

And when the signal lines on the side of the priming device are connected to those on the side of the igniting signal generator, it is separated from the ground line. Therefore, the following connecting work needs great care so as not to cause the igniting circuit to ignite and explode due to the leakage current.

Furthermore, when the signal lines are separated from each other for repairing the igniting circuit, necessary works for constructing the igniting circuit must be repeated again.

Accordingly, one object of the present invention is to provide a connector by which the priming device and the igniting circuit can be connected or separated with good work efficiency.

Another object of the present invention is to provide a connector by which the priming device and the igniting circuit can be connected or separated without any danger of ignition and explosion of the igniting device.

DESCRIPTION OF THE DRAWINGS

Other objects and advantages of the invention will become apparent from the following description of embodiments with reference to the accompanying drawings wherein:

FIG. 2 to FIG. 6 show one embodiment of the connector of the present invention;

FIG. 2 is a longitudinal sectional view of a first connector member;

FIG. 3 is a cross sectional view taken along the line III—III of FIG. 2;

FIG. 4 is a longitudinal sectional view of a second connector member;

FIG. 5 is a cross sectional view taken along the line V—V of FIG. 4; and

FIG. 6 is a longitudinal sectional view of a first member and a second member which are connected to each other.

SUMMARY OF THE INVENTION

Figure 1:
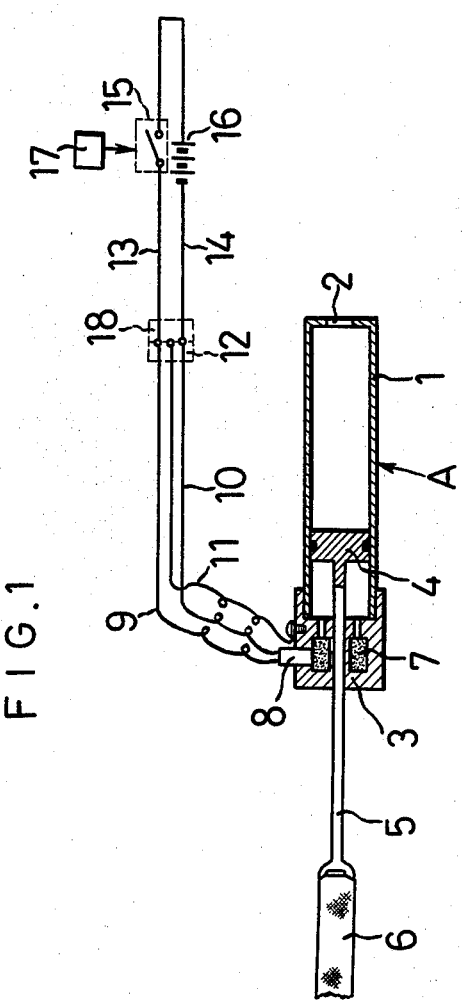
FIG. 1 is a schematic view of a seat belt tensioning device as a priming device, and an ignition device therefor.

A connector provided in an igniting circuit for connecting an igniting signal generator and a priming device of the present invention comprises a first connector member and a second connector member which are connectable to each other. The first connector member comprises a pair of signal terminals connected to the priming device and a ground terminal connected to the ground line. The signal terminals are elastically contacted with the ground terminal. The second connector member comprises a pair of signal terminals connected to the igniting signal generator. These signal terminals are insulated from each other.

When the first connector member is connected to the second connector member, the signal terminal of the first connector member are automatically separated from the ground terminal and then are contacted with the signal terminals of the second connector member.

DETAILED DESCRIPTION OF THE INVENTION

Hereinafter, the connector of the present invention will be explained in accordance with one embodiment wherein the connector of the present invention is applied to an igniting circuit of a seat belt tensioning device for vehicles, as a priming device.

In FIG. 1, a seat belt tensioning device A operates to restrain an occupant by tensioning the seat belt at an urgent time such as upon a vehicle impact.

The seat belt tensioning device A includes a cylinder 1 which has a vent hole 2 formed in one end thereof and a priming device 3 disposed in the other end thereof.

A piston 4 is inserted within the cylinder 1 and a piston rod 5 connected to the piston 4 slidably penetrates the center of the priming device 3. To an end of the piston rod 5 a seat belt 6 is connected.

The priming device 3 has an annular charging chamber 7 wherein a gas generating agent such as propellant is charged. The charging chamber 7 is communicated with the interior of the cylinder 1. To the priming device 3 is attached an ignition device 8 which includes a heating member such as a filament (not shown) and signal lines 9 and 10 connected to the filament.

Each end of the electrical signal lines 9 and 10 is connected to a first connector member 12 together with one end of a ground line 11 of which the other end is grounded to the body of the priming device 3.

Signal lines 13 and 14 on the side of the igniting signal generator 17 are connected to each other through a switch 15 and a battery 16.

The switch 15 is constructed so as to be closed by an electrical signal supplied from an impact sensor 17 as the igniting signal generator.

Each end of the signal lines 13 and 14 on the side of the igniting signal generator is connected to a second connector member 18.

Both of the connector members 12 and 18 are connectable to each other.

And by connecting the connector members 12 and 18, an igniting circuit of the priming device is formed.

Upon a vehicle impact, the switch 15 is closed by the igniting signal supplied from the impact sensor 17 and the electric current from the battery flows through the signal lines 9 and 10 on the side of the priming device 3.

As a result, a heating member such as a filament disposed within the ignition device 8 is electrified, and the gas generating agent is burnt to generate plenty of gas.

Then, the piston 4 is moved rightwards in FIG. 1 to tension the seat belt 6 for restraining and protecting the occupant.

FIG. 2 to FIG. 6 show one embodiment of the connector members 12 and 18.

In FIG. 2 and FIG. 3, an insulating case of the first connector member 12 is made of synthetic resin and is composed of a thick walled base portion 19 and a pipe portion 20 having a rectangular cross section. In the base portion 19, each end of the signal lines 9 and 10 on the side of the priming device 3 and the ground line 11 is buried. Signal terminals 21 and 22 and a ground terminal 23 are also buried in the base portion 19 so as to be connected with each other therewithin.

Each of the terminals 21, 22 and 23 is formed of strip shaped thin plates made of electric conductive and elastic material such as phosphor bronze. The signal terminals 21 and 22 are disposed over and under the ground terminal 23 at equal intervals. Each end of the signal terminals 21 and 22 which are disposed within the pipe portion 20 is curved like circular arc towards the ground terminal 23. And each of the curved portions 21a and 22a of the signal terminals 21 and 22 is elastically contacted with the ground terminal 23. Both ends of the signal terminals 21 and 22 project rightwards slightly compared with the end of the ground terminal 23.

In FIG. 4 and FIG. 5, an insulating case of the second connector member 18 is also composed of a thick walled base portion 24 and a pipe portion 25 and is made of synthetic resin. The end of the signal lines 13 and 14 on the side of the igniting signal generator and the ends of the signal terminals 26 and 27 are buried within the base portion 24 and are connected to each other therewithin.

The pipe portion 25 has such a shape that the pipe portion 20 of the first connector member 12 can be inserted therein or drawn thereout.

Within the pipe portion 25, a rod shaped insulating projection 28 which is integrally formed with the base portion 24 is formed in the central portion thereof towards the opening of the pipe portion 25. And on the upper surface and the lower surface of the insulating projection 28, the signal terminals 26 and 27 are joined respectively.

The end of the insulating projection 28 has tapered surfaces 28a and 28b formed in the upper and lower corner portions thereof. In the axial central portion of the projection 28 is formed an axially extending long slot 29 for inserting the ground terminal 23 of the first connector member 12 from the end of the projection 28.

According to the igniting circuit provided with the above described connector, the signal lines 9 and 10 and the ground line 11 are contacted together as shown in FIG. 2, before the connector members 12 and 18 are connected to each other.

Therefore, the igniting circuit is grounded so that the gas generating agent is prevented from igniting due to the leakage current.

The connector members 12 and 18 are connected to each other, by inserting the pipe portion 25 of the first connector member 12 within the pipe portion 25 of the second connector member 18 as shown in FIG. 6. The ground terminal 23 is inserted within the long slot 29 formed in the insulating projection 28 of the second connector member 18.

Then, the ground line 11 is insulated from the signal lines 9 and 10 and is also kept insulated from the signal lines 13 and 14 on the side of the igniting signal generator.

When the pipe portion 20 is closely inserted within the pipe portion 25, the curved portion 21a and 22a of the signal terminals 21 and 22 of the first connector member 12 are pushed up by the signal terminals 26 and 27 of the second connector member 18.

Thus, the signal lines 9 and 10 on the side of the priming device and the signal lines 13 and 14 on the side of the igniting signal generator are connected to each other to form the igniting circuit.

Each of the signal terminals 21 and 22 of the first connector member 12 extends slightly longer than the ground terminal 23.

Therefore, the priming device is prevented from igniting and exploding due to the leakage current just before the connection of the signal terminals 21 and 22 with those 26 and 27.

And when the connector members 12 and 18 are separated again for repairing them, the signal terminals 21 and 22 disposed within the first connector member 12 are elastically contacted with the ground terminal 23 again as shown in FIG. 2.

As described above, according to the connector of the present invention, the signal lines on the side of the priming device and those on the side of the igniting signal generator are connected or separated by means of the connector provided in the igniting circuit with good work efficiency.

According to the connector of the present invention, by only connecting or separating the connector members as required, the necessary work for forming the igniting circuit can be performed. Therefore, work efficiency can be remarkably improved.

And when the connector members are separated, the ground terminal and the signal terminals are automatically contacted with each other. Therefore, the priming device is no danger of igniting before assembling or during repairing and the connecting work or separating work can be performed with safe.

Furthermore, the connector of the present invention can be widely applied to the igniting circuit of the priming device such as the seat belt tensioning device and the gas bag device for vehicles.

Having now fully described the invention, it will be apparent to one of ordinary skill in the art that many changes and modifications can be made thereto without departing from the spirit or scope of the invention as set forth herein.

What is claimed is:

1. A connector for an igniting circuit connecting an igniting signal generator and a priming device, comprising:
   a first connector member which is connected to said priming device through signal lines;
   said first connector member comprising:
   a casing made of insulating material and provided with an axially extending cavity;
   a ground terminal made of electric conductive material, which is connected to a ground line and projects into said cavity in the axial direction thereof; and
   a pair of signal terminals made of electric conductive and elastic material, which are connected to said signal lines of said priming device respectively and project into said cavity in the axial direction thereof at a predetermined distance from said ground terminal, one portion of each of said signal terminals being elastically contacted with said ground terminal; and a second connector member which is connected to said igniting signal generator through signal lines and is to be engaged with said first connector member;

said second connector member comprising:
- a casing made of insulating material and provided with an axially extending cavity opposing to said cavity of said first connector member;
- a projecting portion made of insulating material, which is axially formed within said cavity and provided with an axially extending slot for receiving said ground terminal therein; and
- a pair of signal terminals made of electric conductive material, which are disposed along said projecting portion so as to be opposed to each other; and are connected to said signal lines of said igniting signal generator;

whereby when said first connector member is engaged with said second connector member, said ground terminal is inserted within said slot formed in said projecting portion of said second connector member and said pair of signal terminals of said first connector member are separated from said ground terminal by said projecting portion and then connected to said signal terminals of said second connector member respectively.

2. A connector according to claim 1, wherein:
said signal terminals of said first connector member extend slightly longer than said ground terminal.

3. A connector according to claim 1, wherein:
each of end portions of said signal terminals of said first connector member to be elastically contacted with said ground terminal is shaped into a circular arc.

4. A connector according to claim 1, wherein:
said casing of said first connector member is composed of a thick walled base portion and a pipe portion integrally formed with said thick walled portion;
each end of said signal lines of said priming device and said ground line and each end of said signal terminals and said ground terminals are buried within said thick walled base portion of said first connector member so as to be connected to each other respectively;

said casing of said second connector member is composed of a thick walled base portion and a pipe portion which is integrally formed with said base portion so as to be opposed to said pipe portion of said first connector member;

said projecting portion is integrally formed with said thick walled base portion; and each of ends of said signal lines of said igniting signal generator and each of ends of said signal terminals are buried within said thick walled base portion of said second connector member so as to be connected to each other respectively.

5. A connector according to claim 4, wherein:
said pipe portion of said first connector member has a rectangular cross section; and
said pipe portion of said second connector member has a rectangular cross section similar to that of said pipe portion of said first connector member.

6. A connector according to claim 5, wherein:
said pipe portion of said first connector member has such a cross section as to be closely inserted within said pipe portion of said second connector member.

7. A connector according to claim 5, wherein:
said signal terminals of said first connector member are formed into a strip shape respectively and are disposed in parallel with each other at a predetermined distance from said ground terminal disposed therebetween;
said ground terminal is formed into a strip shape;
said projecting portion of said second connector member has a rectangular cross section;
said slot has such a cross section as to fit with said ground terminal; and
said signal lines of said second connector member are formed into a strip shape respectively, and are joined to the upper and lower surface of said projection.

8. A connector according to claim 7, wherein:
said signal terminals and said ground terminal are made of a thin phosphor bronze plate respectively.

9. A connector according to claim 1, wherein:
said priming device is a seat belt tensioning device; and
said igniting signal generator is an impact sensor.

* * * * *